United States Patent
Suzuki et al.

(10) Patent No.: US 10,075,952 B2
(45) Date of Patent: Sep. 11, 2018

(54) TERMINAL DEVICE, INTEGRATED CIRCUIT, AND RADIO COMMUNICATION METHOD

(71) Applicant: Sharp Kabushiki Kaisha, Sakai-shi, Osaka (JP)

(72) Inventors: Shoichi Suzuki, Sakai (JP); Tatsushi Aiba, Sakai (JP); Kazuyuki Shimezawa, Sakai (JP); Toshizo Nogami, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 84 days.

(21) Appl. No.: 15/119,454

(22) PCT Filed: Feb. 26, 2015

(86) PCT No.: PCT/JP2015/055580
§ 371 (c)(1),
(2) Date: Aug. 17, 2016

(87) PCT Pub. No.: WO2015/129797
PCT Pub. Date: Sep. 3, 2015

(65) Prior Publication Data
US 2017/0013615 A1   Jan. 12, 2017

(30) Foreign Application Priority Data
Feb. 26, 2014  (JP) .................. 2014-034909

(51) Int. Cl.
*H04W 72/04* (2009.01)
*H04L 1/08* (2006.01)
*H04L 5/00* (2006.01)

(52) U.S. Cl.
CPC .......... *H04W 72/0446* (2013.01); *H04L 1/08* (2013.01); *H04L 5/0053* (2013.01); *H04L 5/0094* (2013.01); *H04W 72/042* (2013.01)

(58) Field of Classification Search
CPC ................................. H04W 72/0446
See application file for complete search history.

(56) References Cited

U.S. PATENT DOCUMENTS 9,756,656 B2 *  9/2017  You ................... H04W 74/006
2012/0287877 A1 * 11/2012  Han ................... H04W 74/002
                                                                370/329

(Continued)

FOREIGN PATENT DOCUMENTS

JP   2013-543347 A   11/2013

OTHER PUBLICATIONS

Official Communication issued in International Patent Application No. PCT/JP2015/055580, dated May 19, 2015.

(Continued)

*Primary Examiner* — Andrew Lai
*Assistant Examiner* — Andrew C Lee
(74) *Attorney, Agent, or Firm* — Keating & Bennett, LLP

(57) ABSTRACT

A number of times to repeat a PDCCH over a plurality of subframes is set, a downlink assignment and information including a parameter that indicates an MBSFN subframe are received, and on the basis of whether the number of times to repeat the PDCCH is set, a determination is made as to whether the downlink assignment can take place in the MBSFN subframe indicated by the parameter.

6 Claims, 8 Drawing Sheets

(56) References Cited

U.S. PATENT DOCUMENTS

| | | | |
|---|---|---|---|
| 2013/0121130 A1* | 5/2013 | Ko | H04L 1/0027 370/208 |
| 2013/0163533 A1* | 6/2013 | Anderson | H04W 72/04 370/329 |
| 2013/0163535 A1* | 6/2013 | Anderson | H04W 72/04 370/329 |
| 2013/0223323 A1 | 8/2013 | Jang et al. | |
| 2013/0243039 A1* | 9/2013 | Khandekar | H04J 13/10 375/134 |
| 2013/0294368 A1* | 11/2013 | Bendlin | H04W 72/042 370/329 |
| 2014/0086173 A1* | 3/2014 | Sadeghi | H04L 5/005 370/329 |
| 2015/0245323 A1* | 8/2015 | You | H04W 72/042 370/329 |
| 2015/0257173 A1* | 9/2015 | You | H04L 1/1864 370/330 |
| 2016/0204921 A1* | 7/2016 | Kim | H04L 12/189 370/312 |
| 2016/0255609 A1* | 9/2016 | Kim | H04J 13/16 370/203 |
| 2017/0005740 A1* | 1/2017 | Yang | H04B 17/309 |

OTHER PUBLICATIONS

Ericsson, "On PDCCH/EPDCCH mapping for enhanced coverage MTC UE", 3GPP TSG RAN WG1 Meeting #76, R1-140744, Feb. 10-14, 2014, pp. 1-5.

Samsung, "PDCCH Coverage Enhancements for MTC UEs", 3GPP TSG RAN WG1 #76, R1-140356, Feb. 10-14, 2014, pp. 1-3.

Ericsson, "Synchronization Signals and Channel Design for D2D Discovery and Communication", 3GPP TSG RAN WG1 Meeting ™76, R1-140774, Feb. 10-14, 2014, pp. 1-7.

\* cited by examiner

TERMINAL DEVICE, INTEGRATED CIRCUIT, AND RADIO COMMUNICATION METHOD

TECHNICAL FIELD

The present invention relates to a terminal device, an integrated circuit, and a radio communication method.

This application claims priority based on Japanese Patent Application No. 2014-034909 filed in Japan on Feb. 26, 2014, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered. In LTE, the orthogonal frequency division multiplexing (OFDM) scheme is used as a downlink communication scheme. In LTE, the single-carrier frequency division multiple access (SC-FDMA) scheme is used as an uplink communication scheme. In LTE, a base station device is also referred to as an evolved NodeB (eNodeB), and a mobile station device is also referred to as a user equipment (UE). LTE is a cellular communication system in which an area is divided into a plurality of cells to form a cellular pattern, each of the cells being served by a base station device. A single base station device may manage a plurality of cells.

In LTE, downlink control information (DCI) is transmitted on a physical downlink control channel (PDCCH) or an enhanced physical downlink control channel (EPDCCH). The DCI is used for the scheduling of a physical downlink shared channel (PDSCH) in a certain cell.

LTE defines a multicast broadcast single frequency network (MBSFN) subframe reserved for an MBSFN in downlink.

A technique of repeatedly transmitting a PDCCH and an EPDCCH in a plurality of subframes has been studied in the 3GPP for the purpose of improving cell coverage (NPL 1).

CITATION LIST

Non Patent Literature

NPL 1:"On PDCCH/EPDCCH mapping for enhanced coverage MTC UE", R1-140774, Ericsson, 3GPP TSG-RAN WG1 Meeting #76, Prague, Czech Republic, 10th-14th Feb. 2014.

SUMMARY OF INVENTION

Technical Problem

In light of the foregoing, an object of the present invention is to provide a terminal device, an integrated circuit, and a radio communication method that enable efficient communication in a radio communication system in which the repetition of a PDCCH or an EPDCCH can be employed.

Solution to Problem (1) In order to accomplish the object described above, the present invention is contrived to provide the following means. That is, a terminal device according to an aspect of the present invention includes: a setting unit that sets a number of times to repeat a PDCCH over a plurality of subframes; and a reception unit that receives a downlink assignment and information including a parameter indicating an MBSFN subframe. The reception unit determines, on the basis of whether or not the number of times to repeat the PDCCH is set, whether the downlink assignment can take place in the MBSFN subframe indicated by the parameter.

(2) Furthermore, a terminal device according to another aspect of the present invention includes: a setting unit that sets a number of times to repeat a PDCCH over a plurality of subframes; and a reception unit that receives the PDCCH with a downlink assignment and information including a parameter indicating an MBSFN subframe. In a case where the number of times to repeat the PDCCH is not set, the reception unit decodes, on the basis of the PDCCH being detected in a subframe except for the MBSFN subframe indicated by the parameter, a PDSCH in the same subframe as the subframe; and in a case where the number of times to repeat the PDCCH is set, the reception unit decodes, on the basis of a repeating PDCCH being detected in the plurality of subframes including the MBSFN subframe indicated by the parameter, a PDSCH in one or a plurality of subframes that are different from the plurality of subframes.

(3) Furthermore, an integrated circuit according to still another aspect of the present invention is mounted in a terminal device and is configured to cause the terminal device to execute a series of functions. The series of functions includes: setting a number of times to repeat a PDCCH over a plurality of subframes; receiving a downlink assignment and information including a parameter indicating an MBSFN subframe; and determining, on the basis of whether or not the number of times to repeat the PDCCH is set, whether the downlink assignment can take place in the MBSFN subframe indicated by the parameter.

(4) Furthermore, an integrated circuit according to still another aspect of the present invention is mounted in a terminal device and is configured to cause the terminal device to execute a series of functions. The series of functions includes: setting a number of times to repeat a PDCCH over a plurality of subframes; receiving a PDCCH with a downlink assignment and information including a parameter indicating an MBSFN subframe; in a case where the number of times to repeat the PDCCH is not set, decoding, on the basis of the PDCCH being detected in a subframe except for the MBSFN subframe indicated by the parameter, a PDSCH in the same subframe as the subframe; and in a case where the number of times to repeat the PDCCH is set, decoding, on the basis of the PDCCH repeated in the plurality of subframes including the MBSFN subframe indicated by the parameter being detected, a PDSCH in one or a plurality of subframes that are different from the plurality of subframes.

(5) Furthermore, a radio communication method according to still another aspect of the present invention is used for a terminal device. The method includes: setting a number of times to repeat a PDCCH over a plurality of subframes; receiving a downlink assignment and information including a parameter indicating an MBSFN subframe; and determining, on the basis of whether or not the number of times to repeat the PDCCH is set, whether the downlink assignment can take place in the MBSFN subframe indicated by the parameter.

(6) Furthermore, a radio communication method according to still another aspect of the present invention is used for a terminal device. The method includes: setting a number of times to repeat a PDCCH over a plurality of subframes; receiving a PDCCH with a downlink assignment and information including a parameter indicating an MBSFN subframe; in a case where the number of times to repeat the PDCCH is not set, decoding, on the basis of the PDCCH being detected in a subframe except for the MBSFN subframe indicated by the parameter, a PDSCH in the same subframe as the subframe; and in a case where the number of times to repeat the PDCCH is set, decoding, on the basis of the PDCCH repeated in the plurality of subframes including the MBSFN subframe indicated by the parameter being detected, a PDSCH in one or a plurality of subframes that are different from the plurality of subframes.

Advantageous Effects of Invention

According to this invention, communication can be performed efficiently in radio communication in which the repetition of PDCCH or EPDCCH can be employed.

DESCRIPTION OF EMBODIMENTS

An embodiment of the present invention will be described below.

According to the present embodiment, a single cell is set for each mobile station device. A cell set for the mobile station device is also referred to as a serving cell. The thus-set single serving cell is also referred to as a primary cell. The primary cell is a serving cell in which an initial connection establishment procedure has been performed, a serving cell in which a connection re-establishment procedure has been started, or a cell indicated as a primary cell in a handover procedure.

The radio communication system according to the present embodiment may employ the time division duplex (TDD) scheme or frequency division duplex (FDD) scheme. The present embodiment will be described assuming that the FDD scheme is employed.

Figure 1:
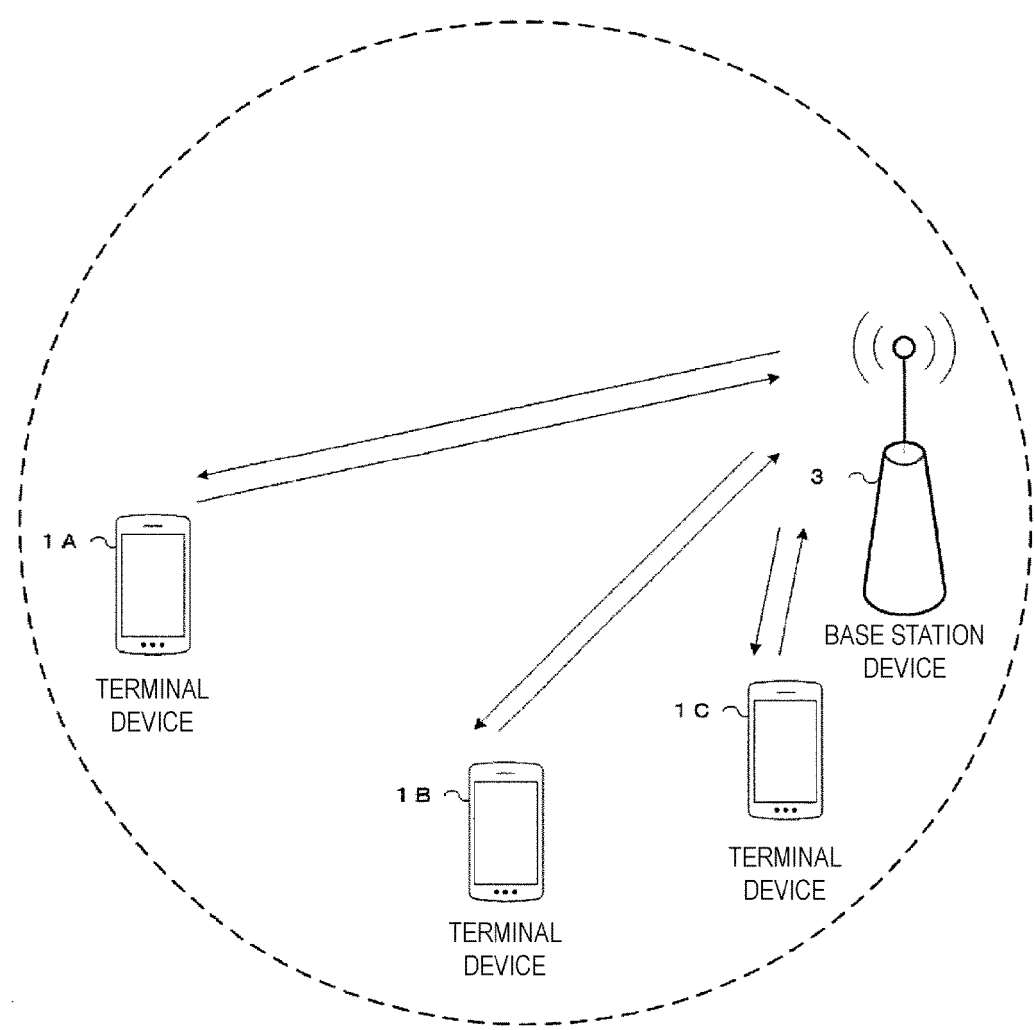
FIG. 1 is a conceptual diagram of a radio communication system according to the present embodiment.

FIG. 1 is a conceptual diagram of the radio communication system according to the present embodiment. In FIG. 1, the radio communication system includes mobile station devices 1A to 1C and a base station device 3. The mobile station devices 1A to 1C are each hereinafter referred to as a mobile station device 1.

A physical channel and a physical signal according to the present embodiment will be described.

In FIG. 1, the following uplink physical channels are used for uplink radio communication from the mobile station device 1 to the base station device 3. The uplink physical channels are used to transmit information output from a higher layer.

Physical uplink control channel (PUCCH)
Physical uplink shared channel (PUSCH)
Physical random access channel (PRACH)

In FIG. 1, the following uplink physical signal is used for the uplink radio communication. The uplink physical signal is not used to transmit information output from the higher layer, but is used by a physical layer.

Uplink Reference Signal (UL RS)

In FIG. 1, the following downlink physical channels are used for downlink radio communication from the base station device 3 to the mobile station device 1. The downlink physical channels are used to transmit the information output from the higher layer.

Physical broadcast channel (PBCH)
Physical control format indicator channel (PCFICH)
Physical hybrid automatic repeat request indicator channel (PHICH)
Physical downlink shared channel (PDSCH)
Physical multicast channel (PMCH)
Physical downlink control channel (PDCCH)
Enhanced physical downlink control channel (EPDCCH)

The PBCH is used to broadcast a master information block (MIB), or a broadcast channel (BCH), that is shared by the mobile station devices 1. The MIB is transmitted at intervals of 40 ms, and, within the interval, the MIB is repeatedly transmitted every 10 ms.

The PCFICH is used to transmit information that indicates a region (OFDM symbols) to be used for transmission of the PDCCH.

The PHICH is used to transmit an HARQ indicator (HARQ feedback or response information) that indicates an acknowledgment (ACK) or a negative acknowledgment (NACK) with respect to uplink data (uplink shared channel (UL-SCH)) received by the base station device 3.

The PDSCH is used to transmit downlink data (downlink shared channel (DL-SCH)).

The PMCH is used to transmit multicast data (multicast channel (MCH)).

The PDCCH and the EPDCCH are used to transmit downlink control information (DCI). The downlink control information is also referred to as a DCI format. The downlink control information includes a downlink grant. The downlink grant is also referred to as downlink assignment or downlink allocation.

The downlink grant is used for the scheduling of a single PDSCH codeword within a single cell. The downlink grant may be used for the scheduling of a PDSCH codeword within the same subframe as the subframe in which the downlink grant is transmitted. The downlink grant may be repeatedly transmitted in a plurality of subframes. The PDSCH codeword may be repeatedly transmitted in a plurality of subframes. The downlink grant repeatedly transmitted in a plurality of subframes may be used for the scheduling of a single PDSCH codeword within a different subframe from the subframes in which the downlink grant is transmitted.

Cyclic redundancy check (CRC) parity bits are attached to the DCI format. The CRC parity bits are scrambled with a cell-radio network temporary identifier (C-RNTI). The C-RNTI is an identifier for identifying a mobile station device within a cell.

The terminal device 1 determines whether or not the PDCCH and the EPDCCH are repeatedly transmitted. The PDCCH and the EPDCCH being repeatedly transmitted means that the same downlink control information (also referred to as the same downlink assignment) are repeatedly transmitted on each of a plurality of PDCCHs or EPDCCHs. The terminal device 1 decodes a single piece of downlink control information using the plurality of PDCCHs and EPDCCHs. For example, the terminal device 1 may combine the plurality of PDCCHs and EPDCCHs and decode the single piece of downlink control information using the combined PDCCHs and EPDCCHs.

The terminal device 1 may determine whether or not the PDCCH and the EPDCCH are repeatedly transmitted on the basis of a downlink reception power or the like. The terminal device 1 may determine whether or not the PDCCH and the EPDCCH are repeatedly transmitted on the basis of a parameter included in information received from the base station device 3.

The terminal device 1 sets the number of times to repeat the PDCCH and the EPDCCH. The terminal device 1 may set the number of times to repeat the PDCCH and the EPDCCH on the basis of the downlink reception power or the like. The terminal device 1 may set the number of times to repeat the PDCCH and the EPDCCH on the basis of a parameter included in a signal originating from the higher layer received from the base station device 3. The number of times to repeat the PDCCH and the EPDCCH is two or more.

In a case where a determination is made that the PDCCH and the EPDCCH are not transmitted repeatedly, the terminal device 1 need not set the number of times to repeat the PDCCH and the EPDCCH.

A state in which the number of times to repeat the PDCCH and the EPDCCH has been set may be referred to as a state in which the repetition of the PDCCH and the EPDCCH is enabled or valid. The terminal device 1 in which the number of times to repeat the PDCCH and the EPDCCH has been set may be a terminal device 1 in which a parameter associated with the repetition of the PDCCH and the EPDCCH has been set.

A state in which the number of times to repeat the PDCCH and the EPDCCH has not been set may be referred to as a state in which the repetition of the PDCCH and the EPDCCH is disabled or invalid. The terminal device 1 in which the number of times to repeat the PDCCH and the EPDCCH has not been set may be a terminal device 1 in which the parameter associated with the repetition of the PDCCH and the EPDCCH has not been set.

A transmission mode is controlled by the base station device 3 on a serving cell-by-serving cell basis. The terminal device 1 sets the transmission mode for a serving cell on the basis of a signal originating from the higher layer received from the base station device 3. In other words, the base station device 3 sets the terminal device 1 in the transmission mode through a signal originating from the higher layer. The transmission mode includes transmission mode 1 to transmission mode 10.

The terminal device 1 may determine a DCI format to monitor on the basis of the transmission mode. For example, a terminal device 1 set in transmission mode 1 monitors DCI format 1A and DCI format 1.

The terminal device 1 in which the number of times to repeat the PDCCH and the EPDCCH has been set may determine a DCI format to monitor on the basis of the transmission mode.

The terminal device 1 in which the number of times to repeat the PDCCH and the EPDCCH has been set may determine a DCI format to monitor regardless of the transmission mode. For example, the terminal device 1 in which the number of times to repeat the PDCCH and the EPDCCH has been set may monitor DCI format 1E.

In FIG. 1, the following downlink physical signals are used in the downlink radio communication. The downlink physical signals are not used to transmit information output from the higher layer, but are used by the physical layer.

Synchronization signal (SS)
Downlink reference signal (DL RS)

The synchronization signal is used in order for the mobile station device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the mobile station device 1 to perform the channel compensation for the downlink physical channel. The downlink reference signal is used in order for the mobile station device 1 to calculate downlink channel state information.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the UL-SCH, and the DL-SCH are transport channels. A channel that is used in a medium access control (MAC) layer is referred to as a transport channel The unit of the transport channel used in the MAC layer is referred to as a transport block (TB) or MAC protocol data unit (PDU). Control of a hybrid automatic repeat request (HARQ) is performed on a transport block-by-transport block basis in the MAC layer. The transport block is a unit of data that the MAC layer delivers to the physical layer. In the physical layer, the transport block is mapped to a codeword, and coding processing is performed on a codeword-by-codeword basis.

A configuration of the radio frame according to the present embodiment will be described below.

Figure 2:
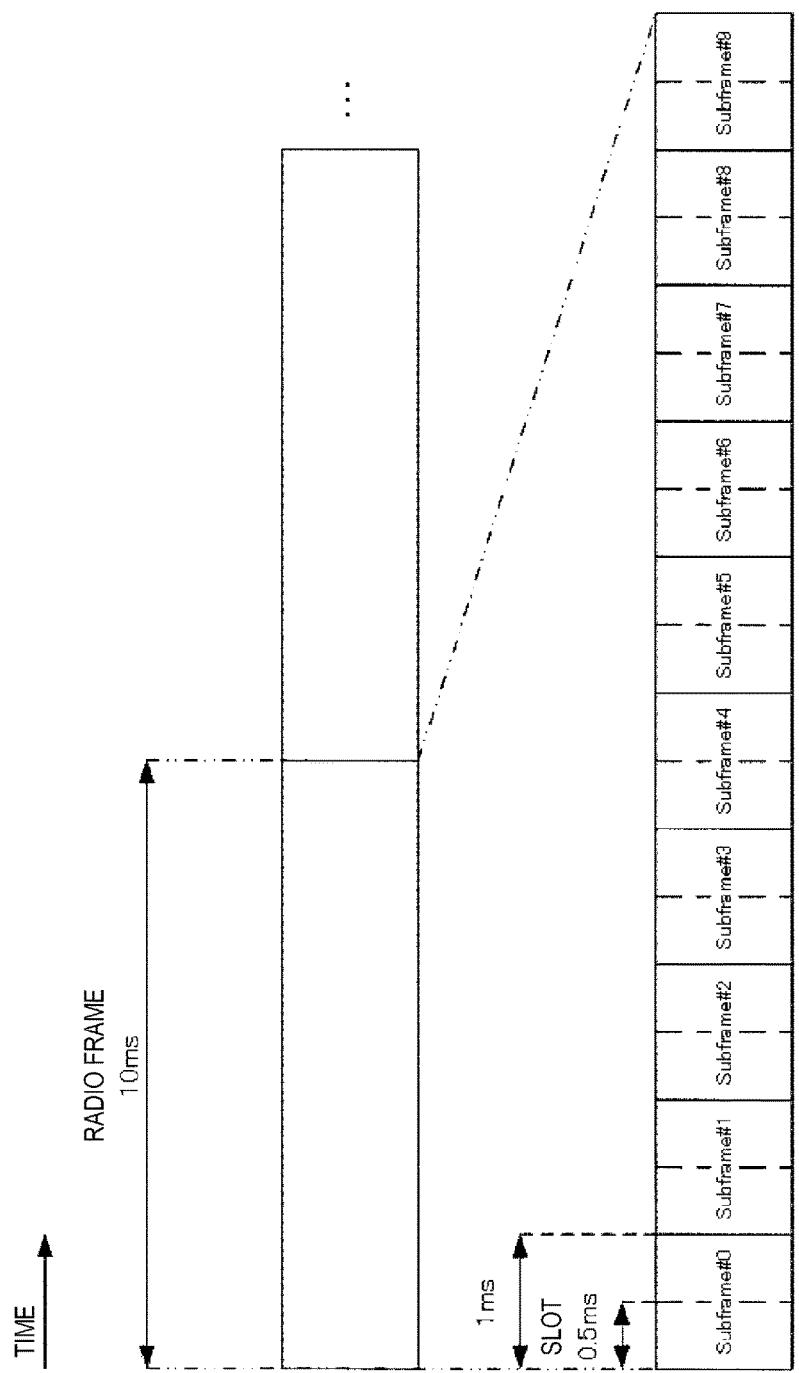
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot.

The configuration of a slot according to the present embodiment will be described below.

Figure 3:
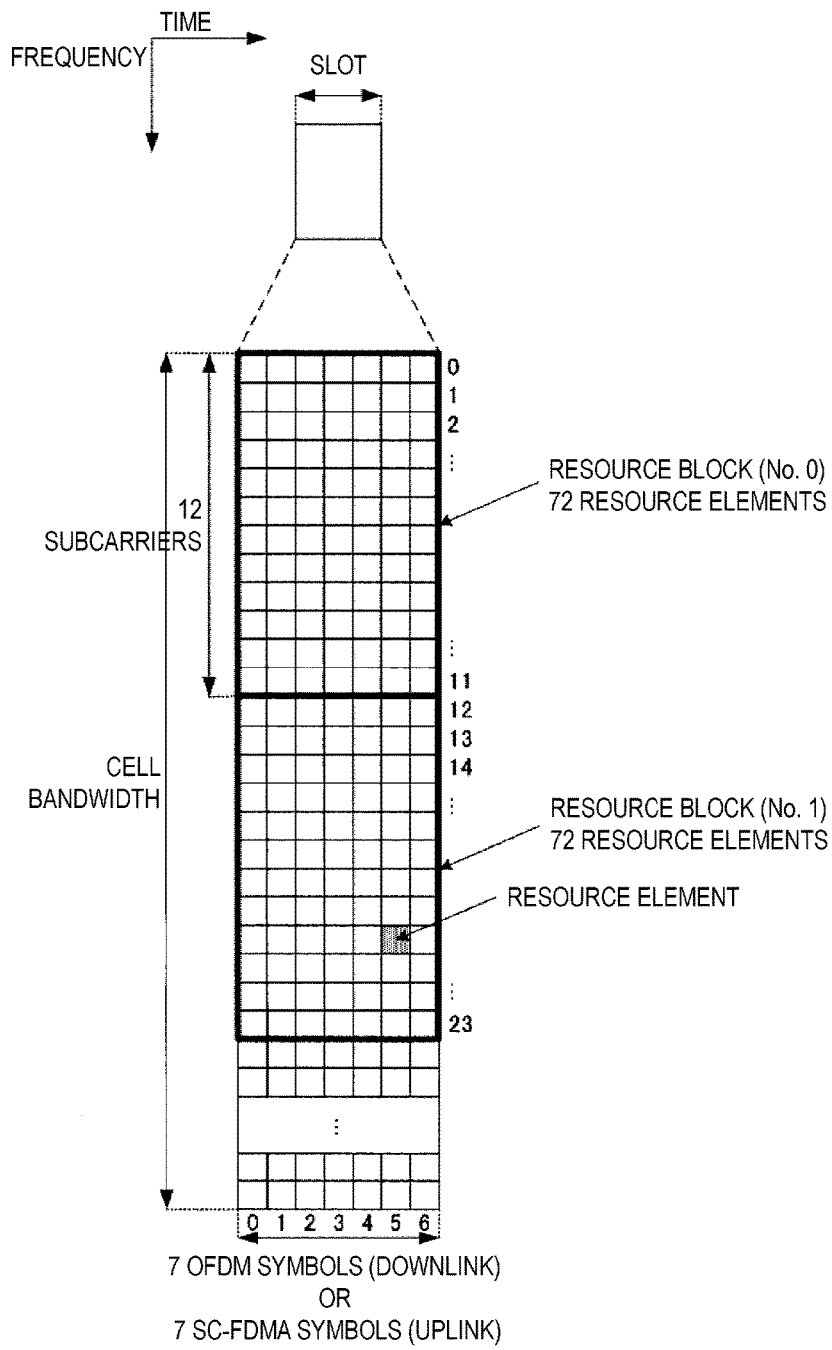
FIG. 3 is a diagram illustrating a configuration of a slot according to the present embodiment.

FIG. 3 is a diagram illustrating the configuration of the slot according to the present embodiment. The physical signal or the physical channel transmitted in each of the slots is expressed by a resource grid. In FIG. 3, the horizontal axis is a time axis and the vertical axis is a frequency axis. In downlink, the resource grid is defined by a plurality of subcarriers and a plurality of OFDM symbols. The number of subcarriers that constitute one slot depends on a cell bandwidth. Seven OFDM symbols constitute one slot. Each of the elements within the resource grid is referred to as a resource element. The resource element is identified by a subcarrier number and an OFDM symbol number.

A resource block is used to express allocation of a certain physical channel (the PDSCH or the like) to resource elements. The resource block is defined by a virtual resource block and a physical resource block. A certain physical channel is first allocated to the virtual resource block. Thereafter, the virtual resource block is mapped to the physical resource block. One physical resource block is defined by seven consecutive OFDM symbols in a time domain and by 12 consecutive subcarriers in a frequency domain. Therefore, one physical resource block is constituted of (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted in each of the subframes will be described below.

Figure 4:
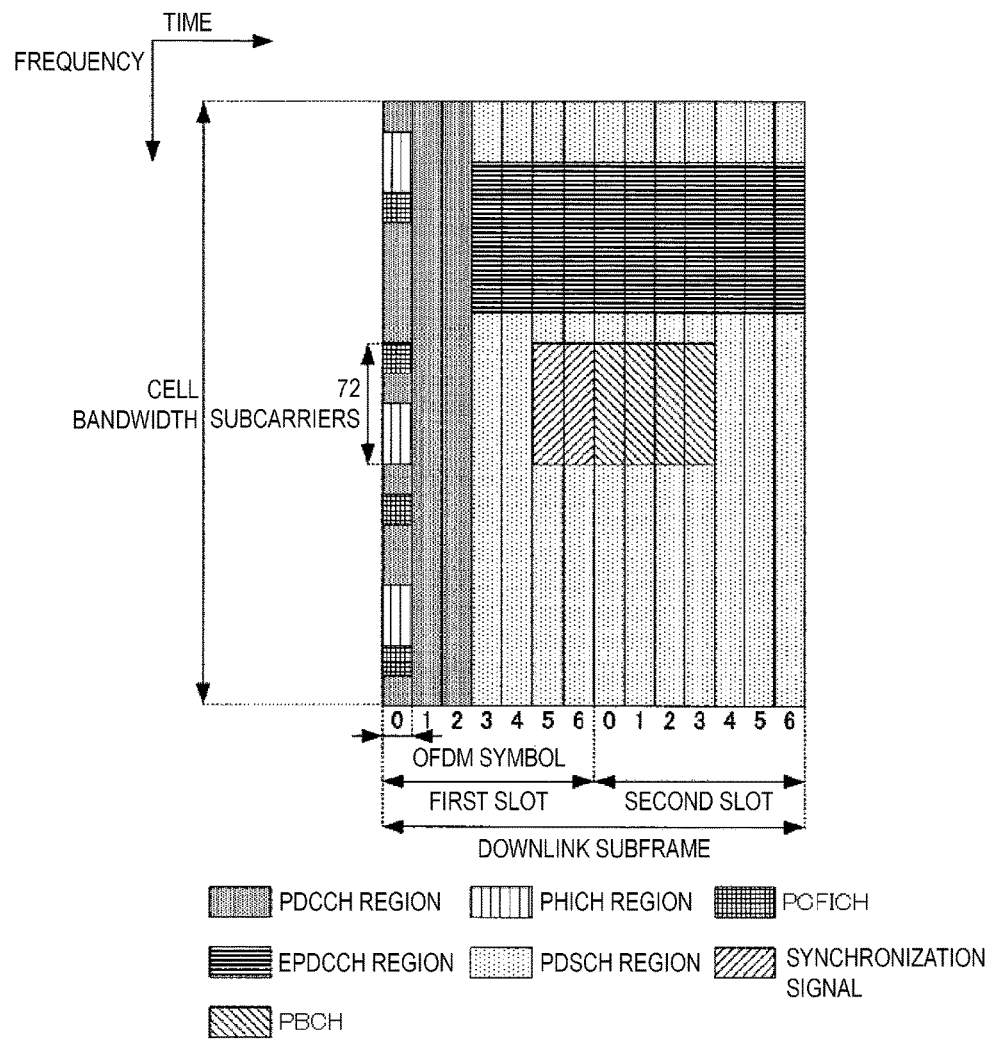
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal in the downlink according to the present embodiment. In FIG. 4, the horizontal axis is a time axis and the vertical axis is a frequency axis. In the downlink, the base station device 3 may transmit the downlink physical channel (the PBCH, the PCFICH, the PHICH, the PDCCH, the EPDCCH, the PDSCH, or the PBCH), and the downlink physical signal (the synchronization signal or the downlink reference signal). Moreover, the downlink reference signal is mapped to the resource elements distributed in the frequency domain and the time domain. The downlink reference signal is not illustrated in FIG. 4 for the sake of simplicity.

A plurality of PDCCHs may be frequency-multiplexed and time-multiplexed in a PDCCH region. A plurality of EPDCCHs may be frequency-multiplexed, time-multiplexed, and spatial-multiplexed in an EPDCCH region. A plurality of PDSCHs may be frequency-multiplexed and spatial-multiplexed in a PDSCH region. The PDCCH and, the PDSCH or the EPDCCH may be time-multiplexed. The PDSCH and the EPDCCH may be frequency-multiplexed.

In the downlink, the subframes include a multicast broadcast single frequency network (MBSFN) subframe and a non-MBSFN subframe. The PMCH may be transmitted only in the MBSFN subframe. The PBCH, the PCFICH, the PHICH, the PDCCH, the EPDCCH, and the PDSCH may be transmitted in MBSFN and non-MBSFN subframes. The PMCH and the PDSCH are not transmitted simultaneously in a single MBSFN subframe in a certain serving cell.

The base station device 3 transmits a signal originating from the higher layer to the terminal device 1, the signal including information indicating the MBSFN and non-MBSFN subframes in the serving cell. The terminal device 1 sets a parameter mbsfn-SubframeConfigList, which indicates the MBSFN and non-MBSFN subframes in the serving cell, on the basis of the signal originating from the higher layer received from the base station device 3. In other words, the terminal device 3 sets the parameter mbsfn-SubframeConfigList, which indicates the MBSFN and non-MBSFN subframes in the serving cell, to the terminal device 1 through the signal originating from the higher layer.

Here, the terminal device 1 may handle a subframe as a non-MB SFN subframe, in a case where the subframe is not indicated as an MBSFN subframe by the parameter mbsfn-SubframeConfigList.

The terminal device 1 may determine whether a downlink assignment can take place in the MBSFN subframe indicated by the parameter mbsfn-SubframeConfigList on the basis of whether or not the number of times to repeat the PDCCH and the EPDCCH is set.

In the case where the number of times to repeat the PDCCH and the EPDCCH is not set, the terminal device 1 may decode, on the basis of the PDCCH or the EPDCCH being detected in a certain subframe except for the MBSFN subframe indicated by the parameter mbsfn-SubframeConfigList, a PDSCH in the same subframe as the certain subframe. In other words, in the case where the number of times to repeat the PDCCH and the EPDCCH is not set, the terminal device 1 may determine that a downlink assignment can take place in a subframe except for the MBSFN subframe indicated by the parameter mbsfn-SubframeConfigList. In the case where the number of times to repeat the PDCCH and the EPDCCH is not set, the terminal device 1 may determine that a downlink assignment cannot take place in the MBSFN subframe indicated by the parameter mbsfn-SubframeConfigList.

Figure 5:
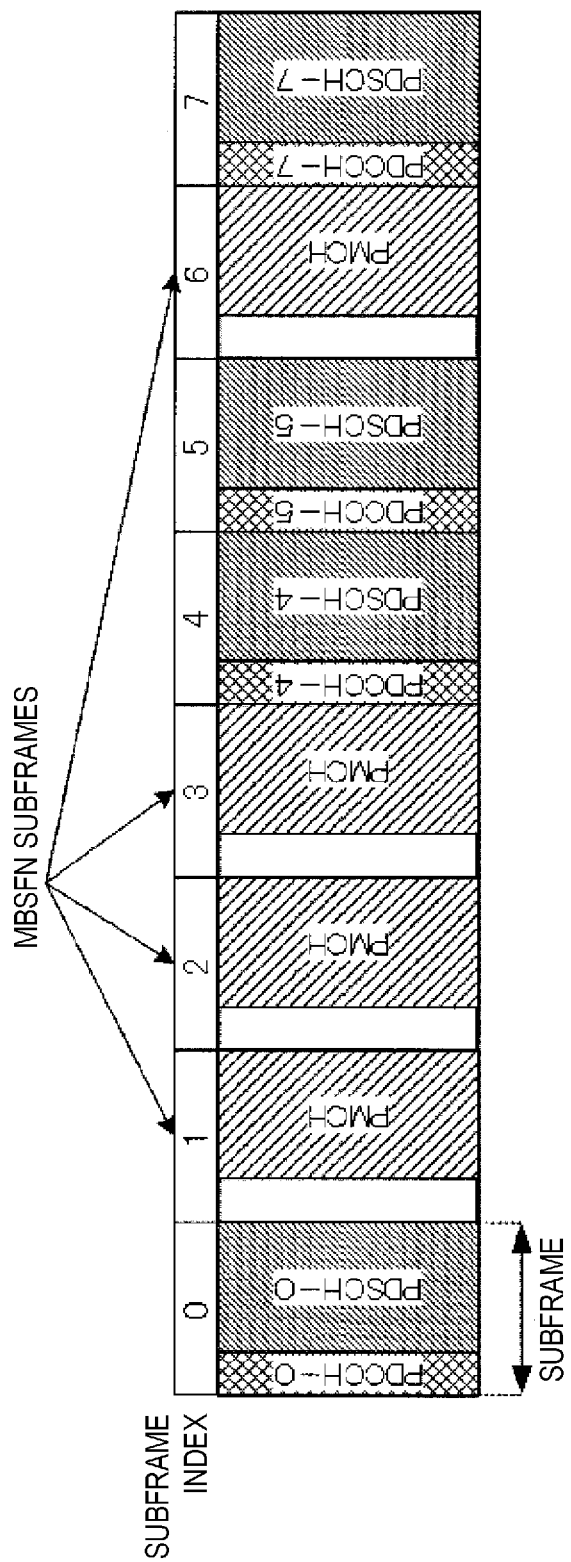
FIG. 5 is a diagram illustrating allocation of channels in a case where the number of times to repeat a PDCCH is not set according to the present embodiment.

FIG. 5 is a diagram illustrating allocation of channels in the case where the number of times to repeat a PDCCH is not set. In FIG. 5, subframes 1, 2, 3, and 6 are MBSFN subframes. In FIG. 5, PDCCH-i is a PDCCH with a downlink assignment. In FIG. 5, PDCCH-i corresponds to PDSCH-i (i=0, 4, 5, 7).

As illustrated in FIG. 5, on the basis of a PDCCH with a downlink assignment being detected in any one of the subframes 0, 4, 5, and 7, which are non-MBSFN subframes, the terminal device 1 decodes the PDSCH scheduled by that downlink assignment in the same subframe. For example, in the case where a PDCCH with a downlink assignment in the subframe 0 (a non-MBSFN subframe) has been detected, the PDSCH in the subframe 0 is decoded on the basis of that downlink assignment.

In the case where the number of times to repeat the PDCCH and the EPDCCH is set, the terminal device 1 may decode, on the basis of the PDCCH or the EPDCCH repeated in a plurality of subframes including the MBSFN subframe indicated by the parameter mbsfn-SubframeConfigList being detected, the PDSCH in one or a plurality of subframes that are different from the plurality of subframes. In other words, in the case where the number of times to repeat the PDCCH and the EPDCCH is set, the terminal device 1 can determine that a downlink assignment will take place in a plurality of subframes including the MBSFN subframe indicated by the parameter mbsfn-SubframeConfigList. In the case where the number of times to repeat the PDCCH and the EPDCCH is set, the terminal device 1 may determine that a downlink assignment can take place in the MBSFN subframe indicated by the parameter mbsfn-SubframeConfigList.

Figure 6:
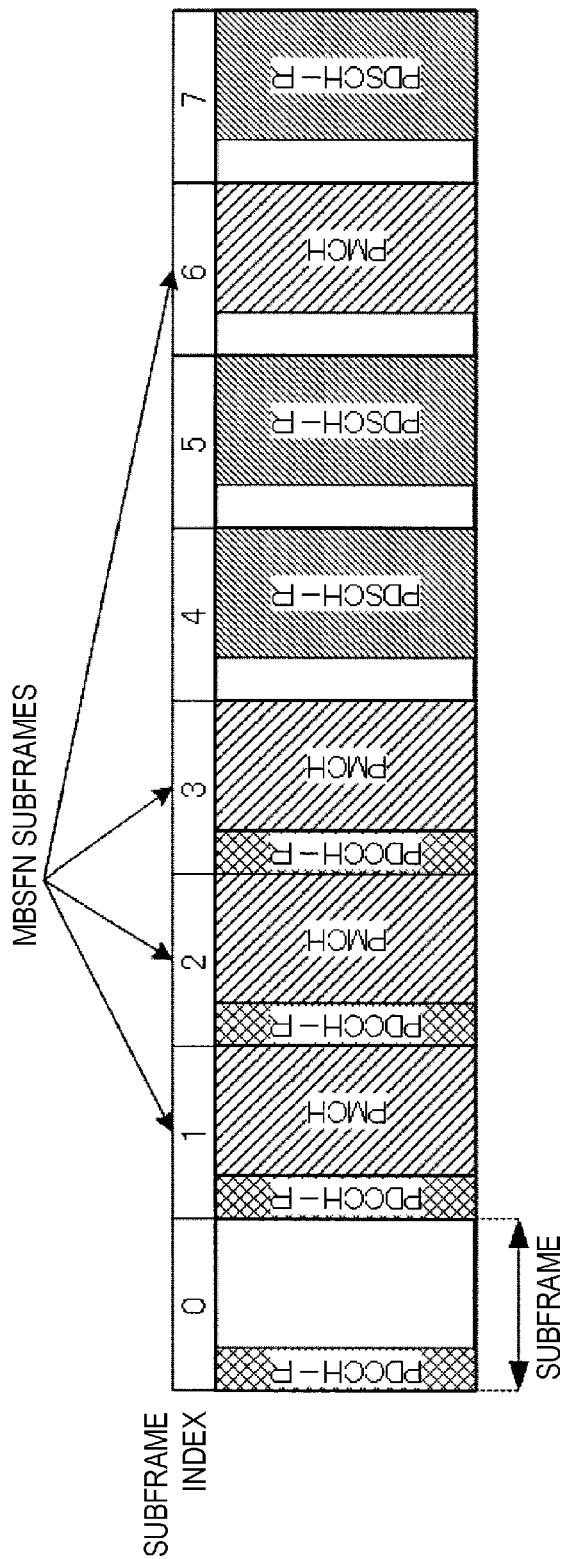
FIG. 6 is a diagram illustrating allocation of channels in a case where the number of times to repeat a PDCCH is set according to the present embodiment.

FIG. 6 is a diagram illustrating allocation of channels in the case where the number of times to repeat the PDCCH is set. In FIG. 6, subframes 1, 2, 3, and 6 are MBSFN subframes. In FIG. 6, PDCCH-R is a PDCCH with the same downlink assignment. In FIG. 6, the PDCCH-R, which is repeatedly transmitted, corresponds to PDSCH-R.

As illustrated in FIG. 6, on the basis of a PDCCH with a downlink assignment repeatedly transmitted in subframes 0, 1, 2, and 3 including MBSFN and non-MBSFN subframes being detected, the terminal device 1 decodes the PDSCH scheduled by that downlink assignment in subframes 4, 5, and 7, which are different from the subframes 0, 1, 2, and 3. Here, the PDSCH corresponding to the PDCCH with the downlink assignment that is repeatedly transmitted in the subframes 0, 1, 2, and 3 including the MBSFN and non-MBSFN subframes is not transmitted in subframe 6 in which the PMCH is transmitted. In other words, the PDSCH corresponding to the PDCCH with the downlink assignment that is repeatedly transmitted in the subframes 0, 1, 2, and 3 including the MBSFN and non-MBSFN subframes is not transmitted in the subframe 6 (an MBSFN subframe).

The PDCCH and the EPDCCH may be scrambled with a pseudo-random sequence. The pseudo-random sequence may be generated on the basis of an RNTI (a C-RNTI, for example), a subframe number, a current number of repetitions, and/or a total number of repetitions.

Figure 7:
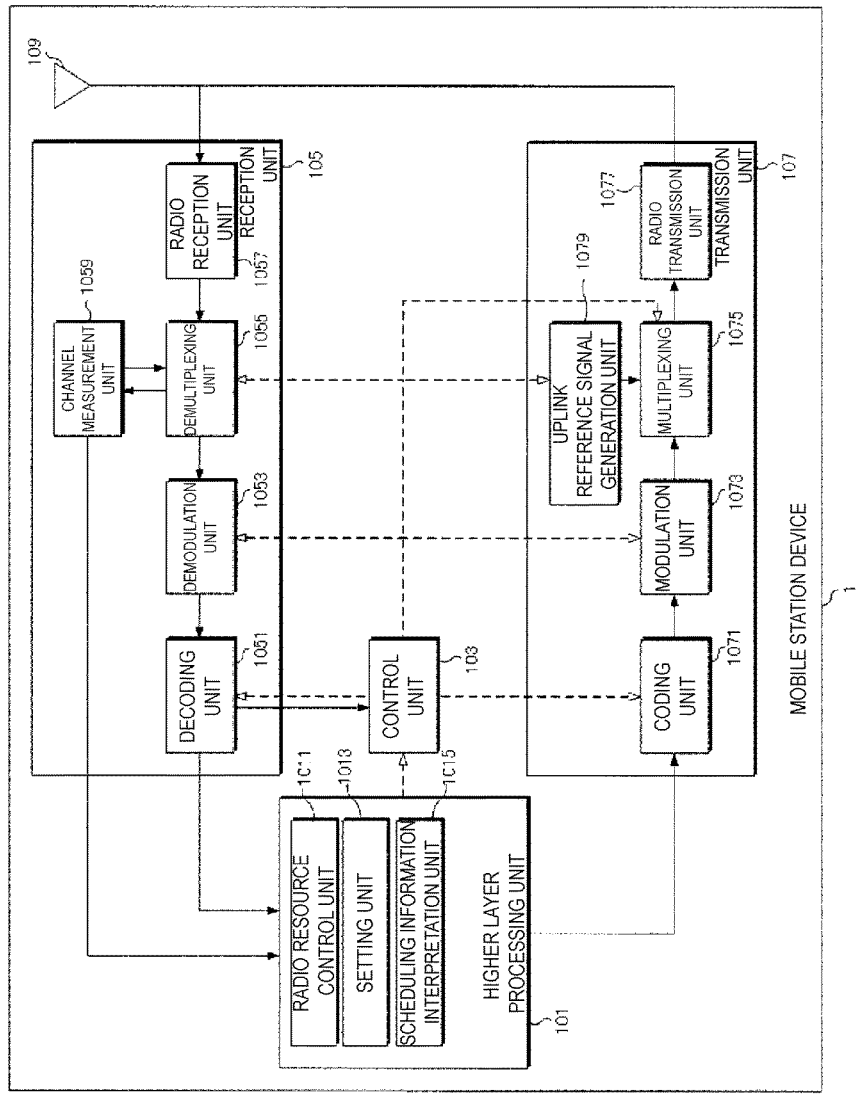
FIG. 7 is a schematic block diagram illustrating a configuration of a mobile station device 1 according to the present embodiment.

FIG. 7 is a schematic block diagram illustrating a configuration of the mobile station device 1 according to the present invention. As illustrated, the mobile station device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a setting unit 1013, and a scheduling information interpretation unit 1015. Furthermore, the reception unit 105 is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like to the transmission unit 107. Furthermore, the higher layer processing unit 101 performs processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various pieces of configuration information of the mobile station device 1 itself. Furthermore, the radio resource control unit 1011 generates information arranged in each channel for uplink, and outputs the generated information to the transmission unit 107.

The setting unit 1013 included in the higher layer processing unit 101 sets the parameter mbsfn-SubframeConfigList. Furthermore, the setting unit 1013 sets the transmission mode associated with the PDSCH.

The scheduling information interpretation unit 1015 included in the higher layer processing unit 101 interprets the DCI format (scheduling information) received through the reception unit 105, generates control information for controlling the reception unit 105 and the transmission unit 107 on the basis of a result of interpreting the DCI format, and outputs the generated control information to the control unit 103.

On the basis of the control information from the higher layer processing unit 101, the control unit 103 generates a control signal for controlling the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the resulting information to the higher layer processing unit 101.

The radio reception unit 1057 converts (down-converts) a downlink signal received through the transmit and receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a guard interval (GI) from the digital signal resulting from the conversion, performs fast Fourier transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the mobile station device 1 itself, and outputs the HARQ indicator resulting from the decoding to the higher layer processing unit 101. The demodulation unit 1053 the demodulates the PDCCH and/or the EPDCCH in compliance with a QPSK modulation scheme, and outputs a result of the demodulation to the decoding unit 1051. The decoding unit 1051 attempts to decodes the PDCCH and/or the EPDCCH. In a case of succeeding in the decoding, the decoding unit 1051 outputs downlink control information resulting from the decoding and an RNTI to which the downlink control information corresponds, to the higher layer processing unit 101. The decoding unit 1051 may also output downlink control information on the physical layer to the control unit 103.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information input from the higher layer processing unit 101 in compliance with a coding scheme, such as convolutional coding or block coding. Furthermore, the coding unit 1071 performs turbo coding, on the basis of information used for the scheduling of PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. On the basis of the information used for the scheduling of the PUSCH, the modulation unit 1073 determines the number of data sequences to be spatial-multiplexed, maps a plurality of pieces of uplink data transmitted on the same PUSCH, to a plurality of sequences, through multiple input multiple output spatial multiplexing (MIMO SM), and performs precoding on the sequences.

The uplink reference signal generation unit 1079 generates a sequence acquired according to a rule (formula) prescribed in advance, on the basis of a physical cell identifier (also referred to as a physical cell identity (PCI), a CELL ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, performs modulation in compliance with an SC-FDMA scheme to generate an SC-FDMA symbol, attaches the guard interval to the SC-FDMA-modulated SC-FDMA symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Figure 8:
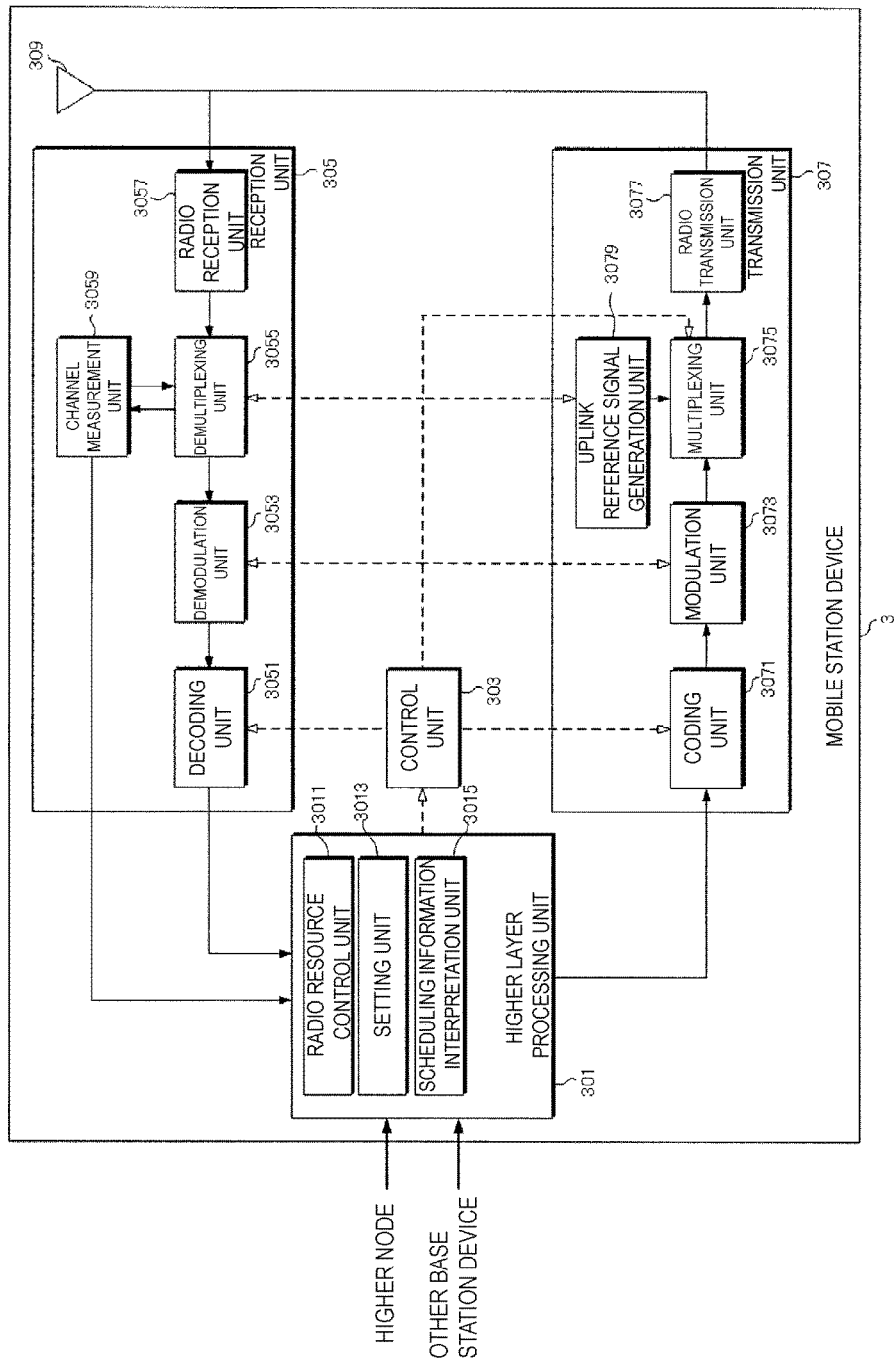
FIG. 8 is a schematic block diagram illustrating a configuration of a base station device 3 according to the present embodiment.

FIG. 8 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a setting unit 3013, and a scheduling unit 3015. Furthermore, the reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information in order to control the reception unit 305 and the transmission unit 307, and outputs the generated control information to the control unit 303.

The radio resource control unit 3011 included in the higher layer processing unit 301 generates, or acquires from a higher node, the downlink data (the transport block) arranged in the downlink PDSCH, system information, an RRC message, a MAC control element (CE), and the like, and outputs a result of the generation or of the acquisition to the transmission unit 307. Furthermore, the radio resource control unit 3011 manages various pieces of configuration information on each of the mobile station devices 1.

The setting unit 3013 included in the higher layer processing unit 301 sets the parameter mbsfn-SubframeConfigList to each of the mobile station devices 1 through a signal originating from the higher layer. The setting unit 3013 sets the transmission mode associated with the transmission of the PDSCH to each of the mobile station devices 1 through the signal originating from the higher layer.

The scheduling unit 3015 included in the higher layer processing unit 301 determines a frequency and a subframe to which the physical channel (the PDSCH and the PUSCH) is allocated, the coding rate and modulation scheme for the physical channel (the PDSCH and the PUSCH), the transmission power, and the like, from a channel estimate, channel quality, or the like input from the channel measurement unit 3059. The scheduling unit 3015 determines whether, in a flexible subframe, the downlink physical channel and/or the downlink physical signal is scheduled or the uplink physical channel and/or the uplink physical signal is scheduled. The scheduling unit 3015 generates the control information (for example, the DCI format) in order to control the reception unit 305 and the transmission unit 307 on the basis of a result of the scheduling, and outputs the generated information to the control unit 303.

The scheduling unit 3015 generates the information used for the scheduling of the physical channel (the PDSCH and the PUSCH), on the basis of the result of the scheduling. The scheduling unit 3015 additionally determines the timing at which the transmission processing and the reception processing are performed, on the basis of a first uplink reference UL-DL configuration, a first downlink reference UL-DL configuration, a second uplink reference UL-DL configuration, a second downlink reference UL-DL configuration, and/or a transmission direction UL-DL configuration.

On the basis of the control information from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the mobile station device 1 through the transmit and receive antenna 309, and outputs the resulting information to the higher layer processing unit 301. The radio reception unit 3057 converts (down-converts) an uplink signal received through the transmit and receive antenna 309 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal.

The radio reception unit 3057 removes a portion corresponding to the guard interval (GI) from the digital signal resulting from the conversion. The radio reception unit 3057 performs a fast Fourier transform (FFT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Moreover, the demultiplexing is performed on the basis of radio resource allocation information that is determined in advance by the base station device 3 using the radio resource control unit 3011, and that is included in the uplink grant notified to each of the mobile station devices 1. Furthermore, the demultiplexing unit 3055 makes an adjustment of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies, in advance with the uplink grant, to each of the mobile station devices 1. The demodulation unit 3053 demultiplexes the modulation symbols of the plurality of pieces of uplink data that are transmitted on the same PUSCH by using the MIMO SM, on the basis of the number of spatial-multiplexed sequences notified in advance with the uplink grant to each of the mobile station devices 1 and on information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the mobile station device 1 by the base station device 3 itself, and outputs, to the higher layer processing unit 101, the decoded uplink data and uplink control information. In a case where the PUSCH is re-transmitted, the decoding unit 3051 performs the decoding using the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 codes the HARQ indicator, the downlink control information, and the downlink data that are input from the higher layer processing unit 301, in compliance with a coding scheme prescribed in advance, such as block coding, convolutional coding, or turbo coding, or in compliance with a coding scheme determined by the radio resource control unit 3011. The modulation unit 3073 modulates the coded bits input from the coding unit 3071, in compliance with a modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the mobile station device 1 and that is acquired according to a rule prescribed in advance on the basis of the physical cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal to the resource elements.

The radio transmission unit 3077 performs inverse fast Fourier transform (IFFT) on a modulation symbol resulting from the multiplexing, performs the modulation in compliance with the OFDM scheme to generate an OFDM symbol, attaches the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 309 for transmission.

The above-described setting unit 1013 sets the number of times to repeat the PDCCH in a plurality of subframes. The above-described reception unit 105 receives information including the parameter mbsfn-SubframeConfigList indicating the MBSFN subframe and the PDCCH with the downlink assignment.

The above-described reception unit 105 may determine whether the downlink assignment can take place in the MBSFN subframe indicated by the parameter, on the basis of whether or not the number of times to repeat the PDCCH and the EPDCCH is set.

In the case where the number of times to repeat the PDCCH is not set, the above-described reception unit 105 may decode, on the basis of the PDCCH being detected in a certain subframe except for the MBSFN subframe indicated by the parameter mbsfn-SubframeConfigList, a PDSCH in the same subframe as the certain subframe.

In the case where the number of times to repeat the PDCCH is set, the above-described reception unit 105 may decode, on the basis of the PDCCH repeated in a plurality of subframes including the MBSFN subframe indicated by the parameter mbsfn-SubframeConfigList being detected, the PDSCH in one or a plurality of subframes that are different from the plurality of subframes.

In the case where the number of times to repeat the PDCCH is not set, the above-described reception unit 105 does not decode the PDCCH in the MBSFN subframe indicated by the parameter mbsfn-SubframeConfigList or need not decode the PDSCH on the basis of the PDCCH being detected in the MBSFN subframe indicated by the parameter.

In a case where the number of times to repeat the PDCCH is not set and the transmission mode is set to any one of transmission mode 1 to transmission mode 8, the above-described reception unit 105 need not decode the PDCCH in the MBSFN subframe indicated by the parameter mbsfn-SubframeConfigList or need not decode the PDSCH on the basis of the PDCCH being detected in the MBSFN subframe indicated by the parameter.

In a case where the number of times to repeat the PDCCH is not set, the transmission mode is set to transmission mode 9 or transmission mode 10, and a length of a cyclic prefix of a first subframe in a radio frame is a length of a normal cyclic prefix, the above-described reception unit 105 may decode, on the basis of the PDCCH being detected in the MBSFN subframe indicated by the parameter mbsfn-SubframeConfigList, except for a subframe indicated to decode PMCH and a subframe set as part of a PRS occasion set only within the MBSFN subframe, the PDSCH in the same subframe as the MBSFN subframe in which the PDCCH has been detected.

In a case where the number of times to repeat the PDCCH is not set, the transmission mode is set to transmission mode 9 or transmission mode 10, and the length of a cyclic prefix of a first subframe in a radio frame is a length of a normal cyclic prefix, the above-described reception unit 105 need not decode the PDCCH in the subframe indicated to decode PMCH and the subframe set as part of a PRS occasion set only within the MBSFN subframe, or need not decode, on the basis of the PDCCH being detected in the subframe indicated to decode PMCH and the subframe set as part of a PRS occasion set only within the MBSFN subframe, a PDSCH in the same subframe as the MBSFN subframe in which the PDCCH has been detected.

A program running on the base station device 3 and the mobile station device 1 according to the present invention may be a program (a program for causing a computer to operate) that controls a central processing unit (CPU) and the like in such a manner as to realize the functions according to the above-described embodiment of the present invention. Then, the information handled in these devices is temporarily stored in a random access memory (RAM) while being processed. Thereafter, the information is stored in various types of read only memory (ROM) such as a flash ROM or a hard disk drive (HDD) and, whenever necessary, is read by the CPU to be modified or rewritten.

Moreover, the mobile station device 1 and the base station device 3 according to the above-described embodiment may be partially realized by the computer. This configuration may be realized by recording a program for realizing such control functions on a computer-readable medium and causing a computer system to read the program recorded on the recording medium for execution.

Moreover, the "computer system" here is defined as a computer system built into the mobile station device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording media" may include a medium that dynamically retains the program for a short period of time, such as a communication line that is used to transmit the program over a network such as the Internet or over a communication circuit such as a telephone circuit and a medium that retains, in that case, the program for a fixed period of time, such as a volatile memory within the computer system which functions as a server or a client. Furthermore, the program may be configured to realize some of the functions described above and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the mobile station device 1 according to the above-described embodiment can also communicate with the base station device as the aggregation.

Furthermore, the base station device 3 according to the above-described embodiment may be an evolved universal terrestrial radio access network (E-UTRAN). Furthermore, the base station device 3 according to the above-described embodiment may have some or all portions of a function of a node higher than an eNodeB.

Furthermore, some or all portions of each of the mobile station device 1 and the base station device 3 according to the above-described embodiment may be realized as an LSI that is a typical integrated circuit or may be realized as a chip set. The functional blocks of each of the mobile station device 1 and the base station device 3 may be individually realized as chip, or some or all of the functional blocks may be integrated into a chip. Furthermore, a circuit integration technique is not limited to the LSI, and the integrated circuit for the functional block may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the mobile station device is described as one example of a terminal device or a communication device, but the present invention is not limited to this, and can be applied to a terminal apparatus or a communication apparatus, such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiment of the invention has been described in detail above referring to the drawings, but the specific configuration is not limited to the embodiment and includes, for example, an amendment to a design that fall within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention can be applied to mobile phones, smart phones, computers, and the like.

REFERENCE SIGNS LIST 1 (1A, 1B, 1C) Mobile station device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Setting unit
1015 Scheduling information interpretation unit
3011 Radio resource control unit
3013 Setting unit
3015 Scheduling unit The invention claimed:

1. A base station device comprising:
   transmission circuitry that transmits a Downlink Control Information (DCI) format repeatedly in a plurality of subframes on a physical downlink control channel or an enhanced physical downlink control channel, the physical downlink control channel or the enhanced physical downlink control channel being scrambled by a pseudo random sequence,
   generation circuitry that generates the pseudo random sequence at least based on an RNTI (Radio Network Temporary Identifier) and a current repetition number for the physical downlink control channel or the enhanced physical downlink control channel, and
   the DCI format is added with cyclic redundancy check parity bits which have been scrambled by the RNTI.

2. The base station device according to claim 1, wherein the generation circuitry generates the pseudo random sequence further based on a subframe number.

3. A terminal device comprising:
   reception circuitry that receives a Downlink Control Information (DCI) format which is repeatedly transmitted in a plurality of subframes on a physical downlink control channel or an enhanced physical downlink control channel, the physical downlink control channel or the enhanced physical downlink control channel being scrambled by a pseudo random sequence, and
   decoding circuitry that decodes the DCI format, wherein
   the pseudo random sequence is generated at least based on an RNTI (Radio Network Temporary Identifier) and a current repetition number for the physical downlink control channel or the enhanced physical downlink control channel, and
   the DCI format is added with cyclic redundancy check parity bits which have been scrambled by the RNTI.

4. The terminal device according to claim 3, wherein the pseudo random sequence is generated further based on a subframe number.

5. A communication method used for a base station device comprising:
   transmitting a Downlink Control Information (DCI) format repeatedly in a plurality of subframes, the physical downlink control channel or the enhanced physical downlink control channel being scrambled by a pseudo random sequence, and
   generating the pseudo random sequence at least based on an RNTI (Radio Network Temporary Identifier) and a current repetition number of the physical downlink control channel or the enhanced physical downlink control channel, wherein
   the DCI format is added with cyclic redundancy check parity bits which have been scrambled by the RNTI.

6. A communication method used for a terminal device comprising:
   receiving a Downlink Control information (DCI) format which is transmitted repeatedly in a plurality of subframes on a physical downlink control channel or an enhanced physical downlink control channel, the physical downlink control channel or the enhanced physical downlink control channel being scrambled by a pseudo random sequence, and
   decoding the DCI format, wherein
   the pseudo random sequence is generated at least based on an RNTI (Radio Network Temporary Identifier) and a current repetition number of the physical downlink control channel or the enhanced physical downlink control channel, and
   the DCI format is added with cyclic redundancy check parity bits which have been scrambled by the RNTI.

* * * * *